March 18, 1924.  
W. T. KLINE  
DEMOUNTABLE WHEEL  
Filed Nov. 14, 1922
1,486,969
3 Sheets-Sheet 1
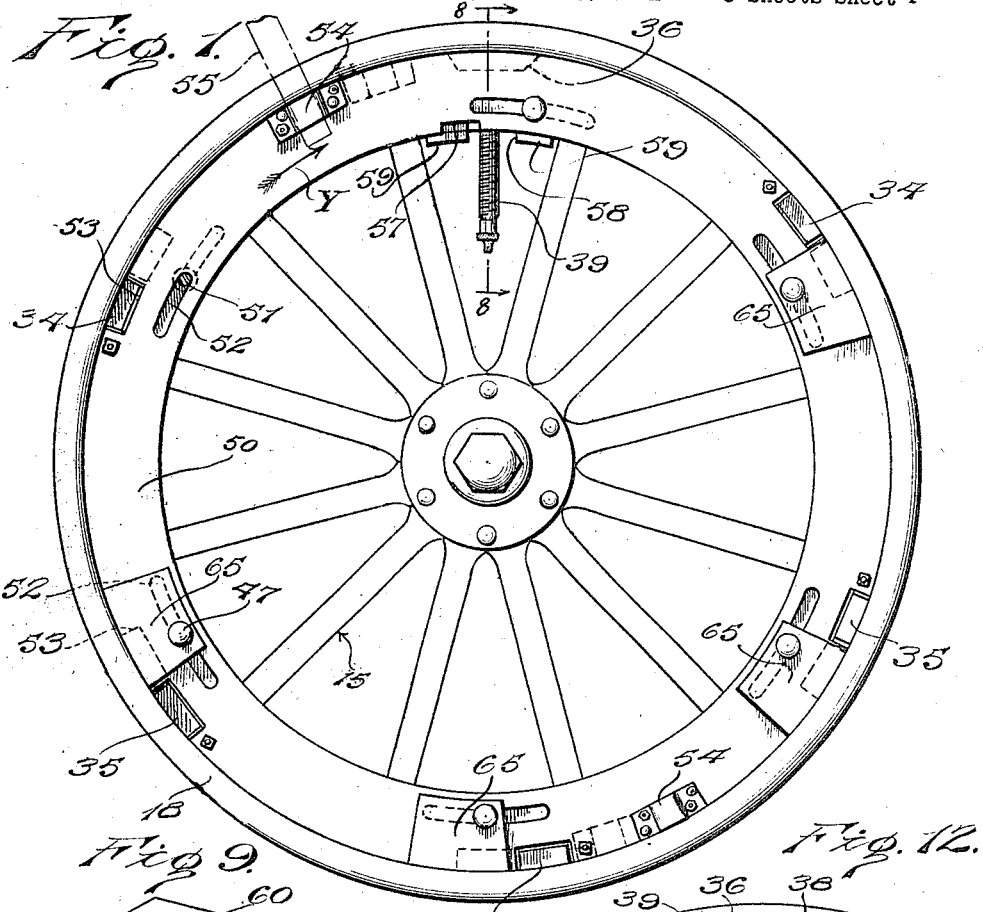
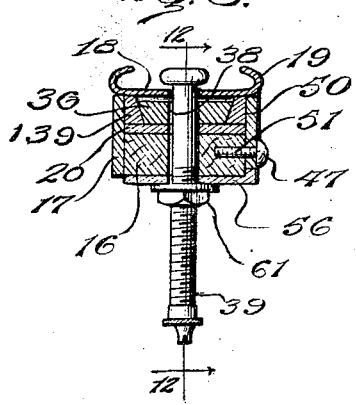
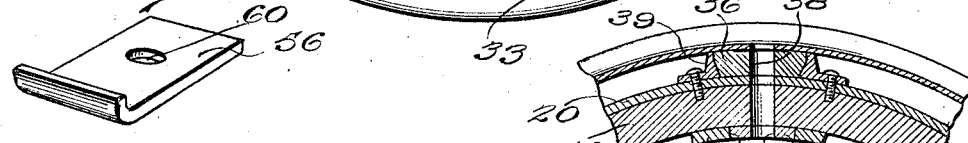
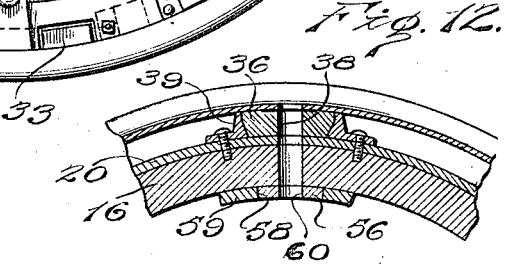
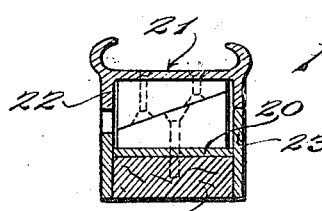
Inventor  
W. T. Kline  
By Lacey & Lacey, Attorneys March 18, 1924. 1,486,969
W. T. KLINE
DEMOUNTABLE WHEEL
Filed Nov. 14, 1922    3 Sheets-Sheet 2
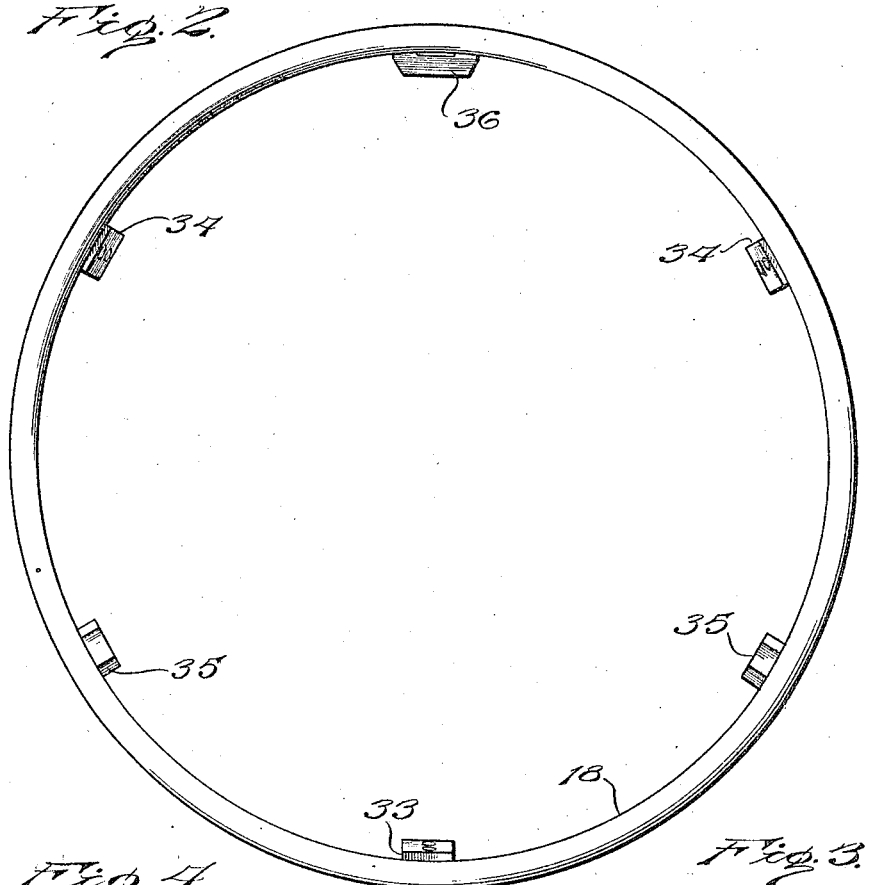
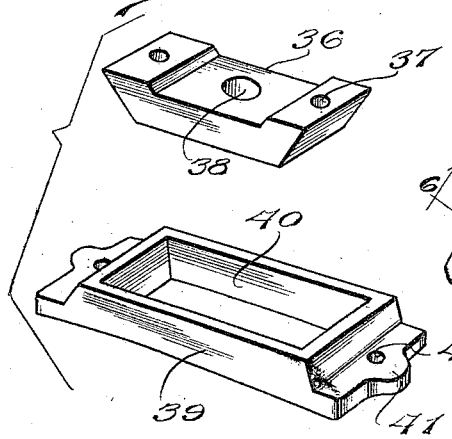
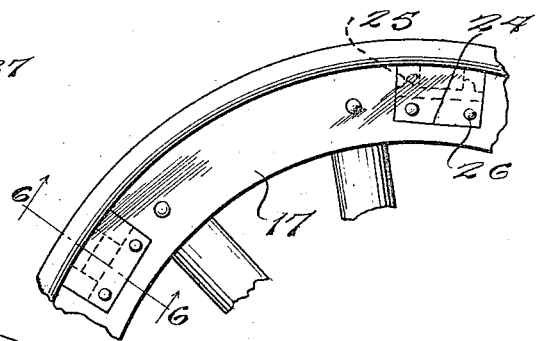
Inventor
W. T. Kline
By
Lacy & Lacy, Attorneys March 18, 1924.
W. T. KLINE
DEMOUNTABLE WHEEL
Filed Nov. 14, 1922    3 Sheets-Sheet 3
1,486,969
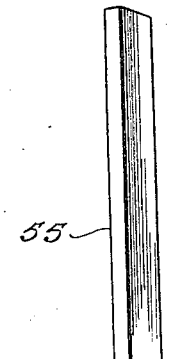
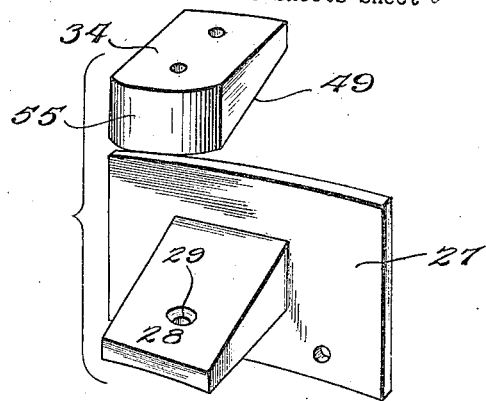
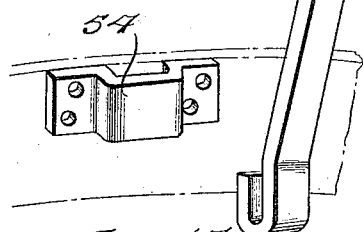
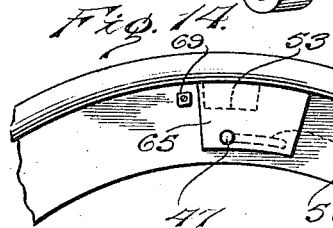
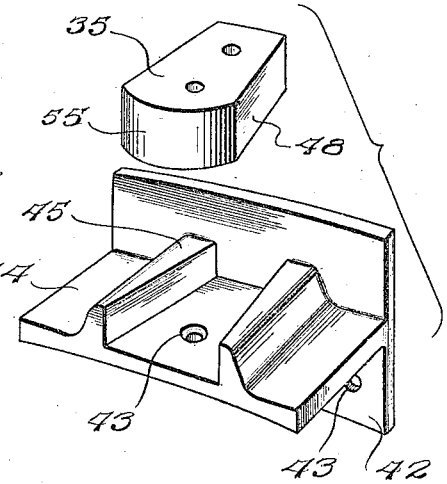
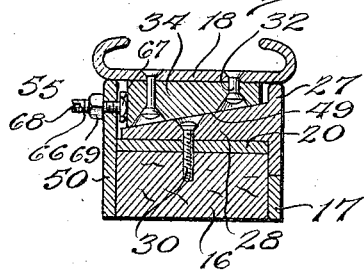
Inventor
W. T. Kline
By Lacey & Lacey, Attorneys Patented Mar. 18, 1924.

1,486,969

UNITED STATES PATENT OFFICE.

WILLIAM T. KLINE, OF MIFFLINBURG, PENNSYLVANIA.

DEMOUNTABLE WHEEL.

Application filed November 14, 1922. Serial No. 600,897.

*To all whom it may concern:*

Be it known that I, WILLIAM T. KLINE, a citizen of the United States, residing at Mifflinburg, in the county of Union and State of Pennsylvania, have invented certain new and useful Improvements in Demountable Wheels, of which the following is a specification.

The present invention relates to demountable rims for wheels of the kind that are used for automobiles and other vehicles provided with pneumatic tires.

The main object of this invention is to provide a wheel of this character, having a rim that can be removed from the wheel very easily and in a very short time. Another object of the invention is to furnish a wheel of this character that will come apart, that is to say, a wheel from which the rim can be removed by simply unscrewing a single nut, namely: the nut on the valve-stem.

It should, however, be noted that the valve-stem is not exposed to any increased strain over what is necessary to retain the valve in position, although the nut for the valve-stem locks and keeps the rim from coming off the wheel.

In the accompanying drawings one embodiment of the invention is illustrated.

Figure 1 shows an external side-view of the wheel, embodying the subject matter of the present invention.

Figure 2 is a similar view of the wheel-rim separate.

Figure 3 is a fragmentary side-view of the wheel, seen from the inner side.

Figure 4 is a perspective view of some of the details.

Figure 5 is a similar view of other details.

Figure 6 is a transverse section along line 6—6 of Figure 3.

Figure 7 is another perspective view of still other details.

Figure 8 is another transverse section along line 8—8 of Figure 1.

Figure 9 is a perspective view of one of the details.

Figure 10 is a perspective view of a tool used in assembling the rim.

Figure 11 is a perspective view of a staple, furnished for said tool.

Figure 12 is a fragmentary section along line 12—12 of Figure 8;

Figure 13 is a cross section, similar to Figure 6, but showing a different type of rim, and Figure 14 is a view similar to Figure 3, but seen from the outer side of the wheel.

In the drawings, reference numeral 15 denotes a wheel, which, in this instance, has been indicated as constructed with wooden spokes and felloe, but it is evident that the device is equally applicable to disk wheels or any other construction of vehicle wheels.

Reference numeral 16 represents the felloe, to which is secured, by means of bolts or rivets, a flat ring 17 of somewhat greater outer diameter than that of the felloe. This ring 17 extends outwardly in radial direction toward rim 18 which is provided with outer flanges 19 for engaging with the rubber shoe of a pneumatic tire, or with the beads of a solid tire. The rim 18, abuts at its inner periphery or bottom, with the outer edge of the ring 17, in order to prevent the entry of mud or dust under the rim.

The felloe 16 is surrounded, in the usual way, by a flat annular band 20, which is shrunk around the felloe and is of the same width as the latter, see Figures 6 and 7. One edge of this annular band 20, as well as the outer side surface of the felloe 16, abuts closely against the flat ring 17, and the rim 18 is spaced with its inner periphery from the outer periphery of the annular band 20, when the rim 18 is of the construction shown in Figure 6. The flat ring 17 extends outwardly in a radial direction beyond the outer periphery of the annular band 20, to meet the bottom of rim 18.

If the rim construction is like that shown at 21 in Figure 13, that is to say, if the rim is provided with inwardly directed annular flanges 22, then the flat ring 23, on the inner side of the felloe 16, lies in the same vertical plane as the inner flange 22, on the rim 21, so that they meet edge to edge.

At intervals, the flat ring 17 is provided with recesses 24, see Figure 3, in which are located transverse guides 25, which are rigidly secured by rivets or bolts 26, to the felloe.

These recesses and guides are spaced at equal distances, circumferentially, around the felloe and are, preferably, of three different kinds, see Figures 4, 5 and 7. One kind of these guides, as seen in Figures 5 and 6, is provided with a side wall in the form of a flat plate 27, which has an inwardly directed wedge block 28, integral therewith. The wedge block has, preferably, a central aperture 29, adapted to receive a securing screw, 30, threaded in the annular band 20, and extending into the wooden felloe 16 for securing the wedge block in position. This wedge block 28, is adapted to rest on top of the annular band 20, with its upper or outer surface slanting from the plate 27 to the opposite side of the wheel, see Figures 5 and 6. In other words, the wedge block 28, is thickest near the plate 27, and thinnest at the opposite end.

The wedge block 28, is adapted to engage with a corresponding spacing piece 34, which is secured by means of rivets 32, on the inner face of the rim 18. The inner surface of the spacing piece tapers in opposite direction to that of the wedge block 28, so that its inner surface 49, engages with the corresponding outer surface of the wedge block 28, when the wheel is assembled as in Figure 6. The spacing pieces 34, as seen at 33 and 34 of Figure 2, have inclined top surfaces and parallel sides, while the spacing pieces shown at 35 of the same figure have their sides tapering in an inward direction to the rim 18, but are otherwise of the same shape as pieces 33 and 34, while all of them have cam surfaces 55 at their outer ends. At the top of Figure 2 is shown a different kind of spacing piece, 36. As indicated, this piece is in the shape of a pyramidic frustum, secured in position, as seen in Figures 2 and 4, and provided with apertures 37 for bolts or rivets for securing the same on the inside of the rim 18. A larger opening, 38, is also provided in this spacing piece, 36, adapted to receive the stem of the valve 39, used for inflating the pneumatic tire.

Instead of the wedge blocks 28, seen in Figure 5, a socket or trough-shaped bracket 39, is provided on the annular band 20, engaging with this pyramidic spacing piece 36. The socket is, for this reason, provided with a central opening 40, corresponding in shape to the spacing piece 36, and intended to engage with the sides thereof. The socket 39, is provided with ears 41, having apertures 42 for bolts or rivets to secure the same rigidly on the annular band 20, of the wheel.

The guides, intended to engage with the spacing pieces 35, have a somewhat different shape to the wedge blocks 28. This is best shown in Figure 7, where the side wall 42 is adapted to fit into one of the recesses 24 of the flat ring 17 where it is secured in position by means of bolts or screws 26, engaging in apertures 43. This guide has a transverse foot 44, fitting the outer periphery of the annular band 20, in order to rest firmly thereon and on the outer side of this foot are shown walls 45, forming between them, an inwardly tapering guide, adapted to engage the tapering sides 48, of the spacing pieces 35.

It will now be evident that, with the pyramidic spacing piece 36, shown at the top of the rim 18 in Figures 1 and 2, the socket 39, must be on top of the annular band 20, while the wedge blocks 28, shown in Figure 5, will be placed symmetrically on each side of the socket 39 on the annular band 20, in order to engage with the spacing pieces 34 in Figure 2. A wedge block 28, is secured at the bottom of the annular band 20, in order to engage with the spacing piece 33 in Figure 2. The guides 42, are spaced symmetrically on each side of the bottom wedge block 28, on the annular band 20, in order to engage with the spacing pieces 35, in Figure 2. In this manner the spacing pieces and the wedges as well as the guides will be spaced 60 degrees apart around the circumference of the wheel, for the purpose of uniformly sustaining the pressure on the wheel rim.

On the outer side face of the wheel is furnished the locking ring 50, which is carried on studs 51, rigidly secured to the felloe 16. These studs have enlarged heads 47 for retaining the locking ring 50, on the felloe. These studs engage in circumferentially running slots 52, spaced around the locking ring 50, and permitting a limited rotation of the locking ring around the axis of the wheel. As seen in Figure 1, the locking ring 50, is placed in unlocked position; that is to say, it has notches 53, provided around the outer periphery thereof and corresponding in width and depth to the spacing pieces 33, 34 and 35 on the rim 18. It will be evident that, with the ring 50, in unlocked position, as seen in Figure 1, it is possible, by pulling the bottom part of the rim 18 outwardly, to disengage it from the wheel felloe.

In order to unlock the ring 50, a staple 54, is provided thereon and a tool 55, see Figure 10, is furnished for engaging in the staple. This tool has a handle of sufficient length to give a good leverage for turning the locking ring 50, in the direction of arrow "Y" for locking the same; or in the opposite direction to this arrow, for unlocking the same. With the ring in the locked position, indicated by dotted lines of the notches 53 and slots 52 in Figure 1, the locking ring will engage with its solid wall against the outer faces 55 of the spacing pieces and in this manner hold the rim 18, firmly on the wheel felloe. In order to secure the ring 50, in its locking position, a latch plate 56, is provided, see Figures 8, 9 and 12, adapted to engage the recess 57 furnished at the inner periphery of the top of the locking ring 50, as seen in Figure 1. This latch plate 56, is of a width corresponding to the width of the recess 58, formed between a pair of lugs 59, furnished on the inner periphery of the felloe 16. The latch plate 56, has a central opening 60, which is placed in alinement with the opening 38, for the valve stem 39, when the parts are assembled. It will be evident, that this latch plate cannot be inserted except when the locking ring 50 is in its locked position and the recess 57 stands opposite the recess 58, formed between the lugs 59. With the parts in this position, the latch plate 56, may now be slipped over the valve stem 39 and locked with the recesses 57 and 58. The valve nut 61, may thereupon be screwed down against the latch plate, to hold the same, as well as the valve, in position on the wheel without adding any strain on the valve, in excess of that for retaining the valve in position, while on the other hand, the latch plate now retains the locking ring 50, in locked position.

It will now be understood, that the rim 18 is secured upon the annular band 20, of the wheel, in radial direction at six different points equally spaced around the rim, namely: at all of the spacing pieces 33, 34, 35 and 36, while the rim is prevented from creeping around the annular band 20, through the engagement of the side faces of the spacing pieces 35 and 36, with the guides 42 and the socket 139, while no added strain, either circumferentially or radially, is exerted on the valve stem 39. But the rim 18 is secured transversely, partly through the engagement of the spacing pieces 33, 34 and 35, with the rings 17 and 50, and partly through the engagement of the side walls of the spacing piece 36, with the side walls of the opening 40, in the socket 139.

In order to dismount the rim from the rest of the wheel the latter is, preferably, positioned as seen in Figures 1 and 2; that is to say, with the valve stem 39 at the top. The nut 61 is first unscrewed, when the latch plate 56 will fall out of the recesses 57 and 58 and by applying the tool 55 to the staple 54, the locking ring 50 may now be turned in the opposite direction of arrow "Y", see Figure 1, until the right ends of the slots 52, engage against the sides of the studs 51. In this position of the locking ring 50, the notches 53, will register with the spacing pieces 33, 34 and 35, so that when subsequently a pull is exerted against the lower part of the ring outwardly or in transverse direction to the plane of the wheel, see Figure 1, the tapering sides and tops of the spacing pieces, wedges and guides, will permit the rim to be tilted outwardly with the piece 36 as fulcrum, while the wheel remains upright. With continued pulling outwardly at the top of the rim, the socket 39 will gradually disengage from the spacing piece 36, and the rim will in this manner be detached from the rest of the wheel.

Instead of securing the locking ring 50, by means of studs 51, which also limit the turning movement of the locking ring by engagement in the slots 52; I may provide guide plates for this purpose, which plates are secured by bolts on the felloe and provided with abutment shoulders engaging studs secured in the rim.

In Figures 1 and 14 are shown guard plates 65 adapted to cover the slots 52 and notches 53, in order to keep out mud and dust when the locking ring 50 is turned into locking position. These guard plates are secured by the studs 51 and their heads 47, while the outer edge of each plate 65 rests against the rim 18.

In Figures 6 and 14 are shown short distance bolts 66 threaded in the locking ring 50 and positioned with the heads 67 inwards, in order to engage with the cam surfaces 55 of the spacing pieces 33, 34 and 35. This arrangement provides a firm connection transversely between the rim and the felloe. Sufficient space is allowed between the locking ring and the surfaces 55 of the spacing pieces for axial adjustment of the bolts 66, which, for this reason, are slotted as at 68, lock nuts 69 for the bolts also being furnished.

The device has been shown as applied to clincher tires, but it is evident that it may be used with equal advantage on rims with straight flanges.

Having thus described the invention, what is claimed as new is:

1. A wheel construction of the class described, comprising a pneumatic tire having an air valve and a securing nut therefor, a felloe, a plurality of radial projections on said felloe and a rim having corresponding projections adapted to engage with said first projections to hold the felloe and the rim in spaced relation; means on said felloe adapted to abut in transverse direction with one end of each of said other projections, a member revolubly mounted on said felloe, adapted to engage with the opposite ends of said other projections to lock the rim transversely to the felloe, said member being provided with notches corresponding to said other projections and adapted to register therewith when said member stands in unlocking position; and a latch associated with said felloe adapted to secure said member in locking position, said member being provided with a recess corresponding with said latch, and said valve and securing nut engaging with said latch to retain it in position.

2. A wheel construction of the class described, comprising, a pneumatic tire having an air valve and a securing nut therefor, a felloe, a plurality of radial projections on said felloe and a rim having corresponding projections adapted to engage with said first projections to hold the felloe and the rim in spaced relation; means on said felloe adapted to abut in transverse direction with one end of each of said other projections; a member revolubly mounted on said felloe, adapted to engage with the opposite ends of said other projections to lock the rim transversely to the felloe, said member being provided with notches corresponding to said other projections and adapted to register therewith when said member stands in unlocking position; a latch on said felloe, adapted to secure said member in locking position, said member being provided with a recess corresponding with said latch, and an aperture being provided in said latch adapted to engage with said valve, said nut when tightened on said valve retaining said latch in engagement with said member.

3. A wheel construction of the class described, comprising a felloe, a plurality of radial projections on said felloe and a rim having corresponding projections adapted to engage with said first projections to hold the felloe and the rim in spaced relation; means on said felloe adapted to abut in transverse direction with one end of each of said other projections; and a member revolubly mounted on said felloe adapted to engage with the opposite ends of said other projections to lock the rim transversely to the felloe, said projections having interengaging, tapering sides adapted to prevent the creeping of the rim around said felloe, and abutment elements on said member adapted to engage with the end faces of said radial projections on the rim to exert pressure thereon in transverse direction of the wheel.

4. A wheel construction of the class described comprising a felloe, a plurality of radial guides secured on said felloe, a rim, blocks secured on said rim and adapted to engage with said guides to hold the felloe and the rim in spaced relation, each of said blocks having a cam surface at one end; means on said felloe adapted to abut in transverse direction with the other end of each of said blocks, a member revolubly mounted on said felloe, and abutments on said member adapted to engage with the cams of said blocks to lock the rim transversely to the felloe, said blocks and guides having inclined interengaging surfaces adapted to prevent radial displacement between said rim and said felloe.

5. A wheel construction of the class described comprising a felloe, a plurality of radial guides secured on said felloe, a rim, blocks secured on said rim and adapted to engage with said guides to hold the felloe and the rim in spaced relation, each of said blocks having a cam surface at one end; means on said felloe adapted to abut in transverse direction with the other end of each of said blocks, a member revolubly mounted on said felloe, and abutments on said member adapted to engage with the cams on said blocks to lock the rim transversely to the felloe, said blocks and guides having interengaging tapering sides adapted to prevent the creeping of the rim around said felloe as well as radial displacement between the rim and the felloe.

6. In a wheel construction, the combination with a pneumatic tire having an air valve and a securing nut therefor; of a rim for said tire, provided with a plurality of projections, a felloe with corresponding projections adapted to engage with said first projections to hold the felloe and the rim in spaced relation; means on said felloe adapted to abut in transverse direction with one end of each of said other projections; a member revolubly mounted on said felloe, adapted to engage with the opposite ends of said other projections to lock the rim transversely to the felloe, said member being provided with notches corresponding to said other projections and adapted to register therewith when said member stands in unlocking position; and a latch on said felloe, adapted to secure said member in locking position, said member being provided with a recess corresponding with said latch; said valve nut being adapted to retain said latch in engagement with said member.

In testimony whereof I affix my signature.

WILLIAM T. KLINE.